United States Patent
Kayano

(10) Patent No.: US 11,414,072 B2
(45) Date of Patent: Aug. 16, 2022

(54) DRIVING ASSIST APPARATUS

(71) Applicant: TOYOTA JIDOSHA KABUSHIKI KAISHA, Toyota (JP)

(72) Inventor: Maki Kayano, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 16/999,128

(22) Filed: Aug. 21, 2020

(65) Prior Publication Data
US 2021/0213942 A1    Jul. 15, 2021

(30) Foreign Application Priority Data
Jan. 9, 2020  (JP) .................. JP2020-001853

(51) Int. Cl.
*B60W 30/09* (2012.01)
*B60W 30/095* (2012.01)
*B60W 50/14* (2020.01)
*G10L 13/04* (2013.01)

(52) U.S. Cl.
CPC ........ *B60W 30/09* (2013.01); *B60W 30/0953* (2013.01); *B60W 50/14* (2013.01); *B60W 2050/143* (2013.01); *G10L 13/04* (2013.01)

(58) Field of Classification Search
CPC .. B60W 30/09; B60W 30/0953; B60W 50/14; B60W 2050/143; B60W 10/06; B60W 10/182; B60W 50/087; B60W 2420/42; B60W 2420/52; B60W 2540/10; B60W 30/08; G10L 13/04; G10L 13/033; G06F 3/167; B60T 7/12; B60K 28/14; B60Q 9/008
See application file for complete search history.

(56) References Cited

U.S. PATENT DOCUMENTS

| | | | |
|---|---|---|---|
| 2007/0142169 A1* | 6/2007 | Marcil | B60K 28/06 477/107 |
| 2012/0322616 A1* | 12/2012 | Fukui | B60W 50/10 477/94 |
| 2015/0307091 A1* | 10/2015 | Gokan | G01S 7/539 701/70 |
| 2019/0039624 A1* | 2/2019 | Ike | B60W 50/14 |

FOREIGN PATENT DOCUMENTS

JP         2005020905 A    1/2005

* cited by examiner

*Primary Examiner* — Jason Holloway
(74) *Attorney, Agent, or Firm* — Dickinson Wright, PLLC

(57) ABSTRACT

A driving assist apparatus executes an autonomous braking control to autonomously stop a vehicle when a level of potential that the vehicle collides with an obstacle is larger than a predetermined level. The driving assist apparatus executes a stopped state keeping control to keep the vehicle stopped to prevent moving of the vehicle after the vehicle is stopped by the autonomous braking control. The driving assist apparatus performs a warning to warn a driver of the vehicle when the driver performs a mistaken pressing operation of mistakenly pressing an acceleration pedal with an intention to press a brake pedal. The driving assist apparatus changes a manner of performing the warning from a first manner to a second manner when the driving assist apparatus stops the vehicle by the autonomous braking control while the driving assist apparatus is performing the warning.

10 Claims, 6 Drawing Sheets

DRIVING ASSIST APPARATUS

BACKGROUND

Field

The invention relates to a driving assist apparatus to warn a driver of a vehicle when the driving assist apparatus presumes that the driver mistakenly presses an acceleration pedal.

Description of the Related Art

There is known a technique to prevent a rapid acceleration of a vehicle derived from a mistaken pressing operation that a driver of the vehicle mistakenly presses an acceleration pedal with the intention to press a brake pedal. For example, an acceleration pedal mistaken operation prevention apparatus is disclosed in JP 2005-20905 A. Hereinafter, this apparatus will be referred to as "the known apparatus." The known apparatus turns on a warning lamp and applies a braking force to the vehicle when the known apparatus detects the driver's mistaken pressing operation.

When the mistaken pressing operation is detected, the driver has an intention to press the brake pedal. Thus, the driver may become panicked with an unintentional moving of the vehicle and continue pressing the acceleration pedal. In this case, it is desirable to warn the driver to prompt the driver to release the acceleration pedal as soon as possible.

In some cases, the vehicle may rapidly approach an obstacle, and an autonomous braking control may be started. After the vehicle is stopped by the autonomous braking control, the driver may calm down. Thereby, emergency level decreases, and it is important to warn the driver to calm down the driver more in order to make the driver take a proper action.

However, the known apparatus simply turns on the warning lamp when the known apparatus detects the driver's mistaken pressing operation. The known apparatus is not configured, considering a change of mental state of the driver. Thus, the known apparatus may not prompt the driver to take a proper action.

SUMMARY

The invention has been made for solving problems mentioned above. An object of the invention is to properly warn the driver when the mistaken pressing operation occurs, and the autonomous braking control is executed.

A driving assist apparatus according to the invention comprises (i) at least one sensor which detects an obstacle surrounding an own vehicle and (ii) an electronic control unit.

The electronic control unit is configured to perform a warning to warn a driver of the own vehicle when the electronic control unit determines that the driver performs a mistaken pressing operation of mistakenly pressing an acceleration pedal of the own vehicle with an intention to press a brake pedal of the own vehicle.

The electronic control unit is configured to execute an autonomous braking control to apply a braking force to the own vehicle to autonomously stop the own vehicle when the electronic control unit determines that a level of potential that the own vehicle collides with the obstacle is larger than a predetermined level.

The electronic control unit is configured to execute a stopped state keeping control to apply the braking force to the own vehicle to keep the own vehicle stopped to prevent moving of the own vehicle after the electronic control unit stops the vehicle by the autonomous braking control.

The electronic control unit is configured to change a manner of performing the warning from a first manner to a second manner when the electronic control unit stops the vehicle by the autonomous braking control while the electronic control unit is performing the warning.

The driving assist apparatus according to the invention comprises the electronic control unit.

The electronic control unit determines whether the driver performs the mistaken pressing operation of mistakenly pressing the acceleration pedal with the intention to press the brake pedal. For example, the electronic control unit determines whether a mistaken pressing determination condition is satisfied. The mistaken pressing determination condition is satisfied when the driver presumably performs the mistaken pressing operation. For example, an operation of rapidly pressing the acceleration pedal can be presumed to be the mistaken pressing operation. Therefore, for example, whether the driver performs the mistaken pressing operation can be determined, based on an amount of pressing the acceleration pedal and a rate of pressing the acceleration pedal.

The electronic control unit performs the warning to warn the driver when the electronic control unit determines that the driver performs the mistaken pressing operation.

The sensor detects the obstacle surrounding the own vehicle. For example, when the driver performs the mistaken pressing operation, the level of the potential that the own vehicle collides with the obstacle, becomes large, and the obstacle is detected by the sensor.

The electronic control unit executes the autonomous braking control to apply the braking force to the own vehicle to autonomously stop the own vehicle when the electronic control unit determines that the level of the potential that the own vehicle collides with the obstacle is large. Thereby, a collision of the own vehicle with the obstacle can be prevented.

Further, the electronic control unit executes the stopped state keeping control to apply the braking force to the own vehicle to keep the own vehicle stopped to prevent moving of the own vehicle which was stopped by the autonomous braking control.

In a situation that the mistaken pressing operation occurs, and the autonomous braking control is started, mental state of the driver after the own vehicle stops is considerably different from the mental state of the driver before the own vehicle stops. The driving assist apparatus according to the invention comprises the sensor and the electronic control unit in order to perform the warning, depending on the mental state of the driver.

Further, the electronic control unit detects that a state of the own vehicle is changed from a moving state to a stopped state by the autonomous braking control while the electronic control unit is performing the warning.

The electronic control unit changes the manner of performing the warning from the first manner to the second manner when the electronic control unit detects that the state of the own vehicle changes from the moving state to the stopped state. Therefore, according to the invention, the warning appropriate to the mental of the driver is performed when the own vehicle moves, and the warning appropriate to the mental of the driver is performed when the own vehicle stops. Thereby, the driver can be prompted to make a proper operation.

According to an aspect of the invention, the electronic control unit may be configured to execute the autonomous braking control and perform the warning in the first manner when the electronic control unit determines that (i) the level of the potential that the own vehicle collides with the obstacle is larger than the predetermined level, and (ii) the driver performs the mistaken pressing operation. In this case, the electronic control unit may be configured to terminate executing the autonomous braking control, execute the stopped state keeping control, and perform the warning in the second manner when the electronic control unit stops the vehicle by the autonomous braking control, and determines that the driver performs the mistaken pressing operation.

According to another aspect of the invention, the at least one sensor may include at least one of a camera sensor and a radar sensor.

According to further another aspect of the invention, the electronic control unit may be configured to determine that the driver performs the mistaken pressing operation when an amount of pressing the acceleration pedal is larger than or equal to an acceleration pedal pressing amount threshold, and a rate of pressing the acceleration pedal is larger than or equal to an acceleration pedal pressing rate threshold.

According to further another aspect of the invention, the warning may be a warning of generating voice sound. In this aspect, at least one of a volume of the voice sound, a rate of generating the voice sound, and a cycle of generating the voice sound of the warning in the second manner may be smaller than at least corresponding one of the volume of the voice sound, the rate of generating the voice sound, and the cycle of generating the voice sound of the warning in the first manner.

According to this aspect of the invention, the warning of generating the voice sound is performed when the mistaken pressing operation is determined to be performed. In addition, at least one of the volume of the voice sound, the rate of generating the voice sound, and the cycle of generating the voice sound of the warning after the own vehicle stops is smaller than at least corresponding one of the volume of the voice sound, the rate of generating the voice sound, and the cycle of generating the voice sound of the warning before the own vehicle moves.

For example, after the own vehicle is stopped by the autonomous braking control, the driver may calm down. Thereby, emergency level may decrease. Thus, it is important to calm down the driver to prompt the driver to take a proper action. In this regard, if the voice sound is generated in an emergency manner, similar to when the own vehicle moves, the driver may have emergency feelings and become unlikely to take a proper action.

Lowering the volume of the voice sound can calm down the driver to prompt the driver to take a proper action. Also, lowering the rate of generating the voice sound can calm down the driver to prompt the driver to take a proper action. Also, elongating the cycle of generating the voice sound can calm down the driver to prompt the driver to take a proper action.

According to this aspect of the invention, at least one of the volume of the voice sound, the rate of generating the voice sound, and the cycle of generating the voice sound of the warning after the own vehicle stops is smaller than at least corresponding one of the volume of the voice sound, the rate of generating the voice sound, and the cycle of generating the voice sound of the warning before the own vehicle moves. As a result, the proper warning to the driver can be performed.

According to further another aspect of the invention, the warning may be a warning of generating voice sound. In this aspect, the warning in the first manner may be a warning of generating the voice sound expressing a content to prompt the driver to release the acceleration pedal. In addition, the warning in the second manner may be a warning of generating the voice sound expressing a content to prompt the driver to press the brake pedal.

According to this aspect of the invention, the content of the voice sound is changed when the state of the own vehicle changes from the moving state to the stopped state. It is important to make the driver to release the acceleration pedal when the mistaken pressing operation is performed.

According to this aspect of the invention, the warning of generating the voice sound of the content to prompt the driver to release the acceleration pedal, is performed when the own vehicle moves (the driver has presumably become panicked). Thus, the driver is urged to concentrate on releasing the acceleration pedal. After the own vehicle stops, the driver may calm down. Thus, the warning of generating the voice sound of the content to prompt the driver to press the brake pedal, is performed. Then, the driver may press the brake pedal.

Therefore, according to this aspect of the invention, the proper warning to the driver can be performed.

According to further another aspect of the invention, the warning may be a warning of generating voice sound. In this aspect, at least one of a volume of the voice sound, a rate of generating the voice sound, and a cycle of generating the voice sound of the warning in the second manner may be smaller than at least corresponding one of the volume of the voice sound, the rate of generating the voice sound, and the cycle of generating the voice sound of the warning in the first manner. In addition, the warning in the first manner may be a warning of generating the voice sound expressing a content to prompt the driver to release the acceleration pedal. In addition, the warning in the second manner may be a warning of generating the voice sound expressing a content to prompt the driver to press the brake pedal.

According to this aspect of the invention, the further proper warning to the driver can be performed.

According to further another aspect of the invention, the warning may be a warning of generating voice sound and displaying character display having the same content as a content expressed by the voice sound.

According to this aspect of the invention, the warning of generating the voice sound and displaying the character display is performed to the driver. The content of the character display is the same as the content of the voice sound. Therefore, when the change of the state of the own vehicle from the moving state to the stopped state is detected, the contents of the voice sound and the character display are changed from the contents to prompt the driver to release the acceleration pedal to the contents to prompt the driver to press the brake pedal. Therefore, according to this aspect of the invention, the further proper warning can be performed to the driver.

According to further another aspect of the invention, the electronic control unit may be configured to terminate performing the warning when the electronic control unit terminates executing the stopped state keeping control.

According to further another aspect of the invention, the electronic control unit may be configured to terminate performing the warning when the brake pedal is pressed.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Below, a driving assist apparatus according to an embodiment of the invention will be described with reference to the drawings.

Figure 1:
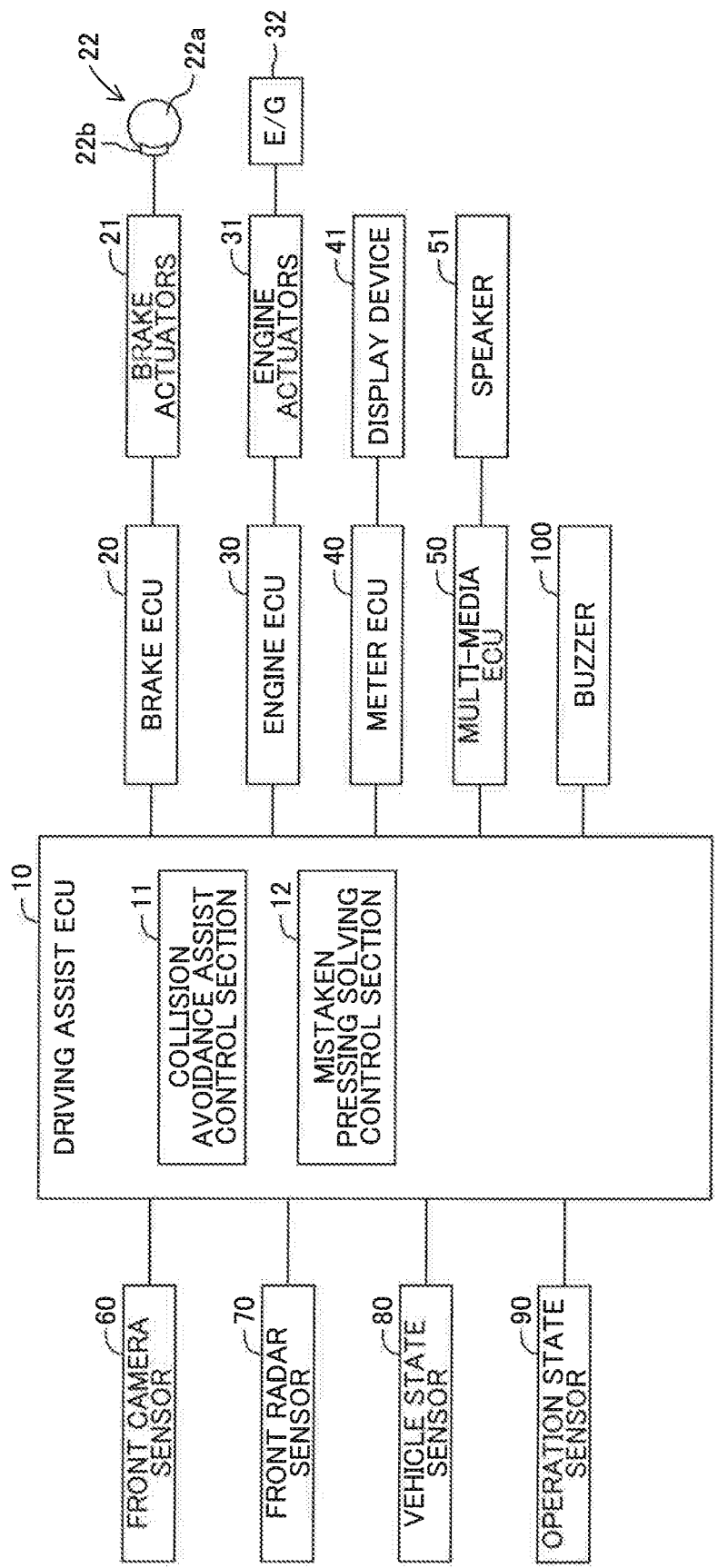
FIG. 1 is a view which shows a driving assist apparatus according to an embodiment of the invention.

The driving assist apparatus according to the embodiment of the invention is installed in a vehicle. Hereinafter, the vehicle installed with the driving assist apparatus according to the embodiment of the invention will be referred to as "the own vehicle" in order to distinguish the own vehicle from other vehicles. As shown in FIG. 1, the driving assist apparatus according to the embodiment of the invention includes a driving assist ECU 10, a brake ECU 20, an engine ECU 30, a meter ECU 40, and a multi-media ECU 50.

The ECU's 10, 20, 30, 40, and 50 are electronic control units. Each of them includes a micro-computer as a main component. The ECU's 10, 20, 30, 40, and 50 are connected to each other via a CAN (Controller Area Network). Each of the ECU's 10, 20, 30, 40, and 50 can send and receive data to and from the remaining of the ECU's 10, 20, 30, 40, and 50. In this embodiment, the micro-computer includes a CPU, a ROM, a RAM, a non-volatile memory, and an interface I/F. The CPU realizes various functions by executing instructions, programs, and routines memorized in the ROM. Some or all of the ECU's 10, 20, 30, 40, and 50 may be integrated in one ECU.

The driving assist ECU 10 is a main control unit which provides a driver driving assist to a driver of the own vehicle. The driving assist ECU 10 includes a collision avoidance assist control section 11 and a mistaken pressing solving control section 12.

The collision avoidance assist control section 11 executes a collision avoidance assist control. The collision avoidance assist control is a control to (i) warn the driver when an obstacle is detected ahead of the own vehicle and (ii) avoid the vehicle from colliding with the obstacle by an autonomous braking control when a level of potential that the vehicle collides with the obstacle is large. The collision avoidance assist control is generally referred to as "the PCS control" or "pre-crash safety control." Hereinafter, the collision avoidance assist control will be referred to as "the PCS control", and the collision avoidance assist control section 11 will be referred to as "the PCS control section 11."

The mistaken pressing solving control section 12 executes a mistaken pressing solving control. The mistaken pressing solving control is a control to (i) determine whether a driver's mistaken pressing operation occurs and (ii) warn the driver and limit a driving force applied to the own vehicle to prevent a rapid acceleration of the own vehicle when the driving assist apparatus determines that the driver's mistaken pressing operation occurs.

The PCS control section 11 and the mistaken pressing solving control section 12 will be described after a general configuration of the driving assist apparatus is described.

The driving assist ECU 10 is electrically connected to a front camera sensor 60, a front radar sensor 70, vehicle state sensors 80, operation state sensors 90, and a buzzer 100.

The front camera sensor 60 is provided at an upper portion of a front windshield in an interior of the own vehicle. The front camera sensor 60 takes images of a view ahead of the own vehicle. The front camera sensor 60 realizes (i) white lane markings on a road and (ii) standing objects ahead of the own vehicle, based on the taken images. The front camera sensor 60 provides (i) information on the white lane markings as white lane marking information and (ii) information on the standing objects as standing object information to the driving assist ECU 10 with a predetermined cycle. The white lane marking information is information on (i) shapes of the white lane markings and (ii) relationships in position between the own vehicle and the white lane markings. The standing object information is information on (i) kinds and sizes of the standing objects detected ahead of the own vehicle and (ii) relationships in position between the own vehicle and the standing objects. The kinds of the standing objects may be recognized by machine learning such as pattern matching.

The front radar sensor 70 is provided on a front center portion of a body of the own vehicle. The front radar sensor 70 detects the standing objects ahead of the own vehicle. The front radar sensor 70 radiates radio waves of millimeter waveband. Hereinafter, the radio wave of the millimeter waveband will be referred to as "the millimeter waves." The front radar sensor 70 receives the millimeter waves reflected by the standing objects such as other vehicles, walking persons, bicycles, and buildings within a radiation area. The front radar sensor 70 perform calculations to calculate (i) distances between the own vehicle and the standing objects, (ii) relative speeds between the own vehicle and the standing objects, and (iii) relative positions or orientations of the standing objects relative to the own vehicle, based on (i) differences in phase between the radiated millimeter waves and the received millimeter waves (i.e., the reflected waves), (ii) attenuation levels of the reflected waves, and (iii) amounts of time from radiating the millimeter waves to receiving the millimeter waves. The front radar sensor 70 provides information on results of the calculations as the standing object information to the driving assist ECU 10 with the predetermined cycle.

The driving assist ECU 10 synthesizes the standing object information provided from the front camera sensor 60 and the standing object information provided from the front radar sensor 70 to acquire the high-accuracy standing object information.

Hereinafter, the front camera sensor 60 and the front radar sensor 70 will be collectively referred to as "the front sensors", and information on situations ahead of the own vehicle acquired from the front camera sensor 60 and the front radar sensor 70 will be referred to as "the front sensor information."

The vehicle state sensors 80 include a vehicle moving speed sensor, a longitudinal acceleration sensor, a lateral acceleration sensor, and a yaw rate sensor. The vehicle moving speed sensor detects a moving speed of the own vehicle. The longitudinal acceleration sensor detects a longitudinal acceleration of the own vehicle. The lateral acceleration sensor detects a lateral acceleration of the own vehicle. The yaw rate sensor detects a yaw rate of the own vehicle.

The operation state sensors 90 include sensors or switches which detect driver's operations. The operation state sensors 90 include an acceleration pedal operation amount sensor, a brake pedal operation amount sensor, a brake switch, a steering angle sensor, a steering torque sensor, a blinker switch, and a shift position sensor. The acceleration pedal operation amount sensor detects an amount of pressing an acceleration pedal or an accelerator position. The brake operation amount sensor detects an amount of pressing a brake pedal. The brake switch detects an operation applied to the brake pedal. The steering angle sensor detects a steering angle. The steering torque sensor detects a steering torque. The blinker switch detects an activation state of blinkers. The shift position sensor detects a shift position of a transmission.

Information detected by the vehicle state sensors 80 and the operation state sensors 90 is provided to the driving assist ECU 10 via the CAN (not shown) with the predetermined cycle. Hereinafter, the information detected by the vehicle state sensors 80 and the operation state sensors 90 will be referred to as "the sensor information."

The buzzer 100 generates sounds in response to a buzzer drive signal output from the driving assist ECU 10. The driving assist ECU 10 outputs the buzzer drive signal to the buzzer 100 to cause the buzzer 100 to generate the sounds to warn the driver.

The brake ECU 20 is electrically connected to brake actuators 21. The brake actuators 21 are provided in hydraulic circuits between a master cylinder (not shown) and friction brake mechanisms 22. The master cylinder compresses hydraulic oil by pressing force applied to the brake pedal. The friction brake mechanisms 22 are provided, corresponding to a left front wheel, a right front wheel, a left rear wheel, and a right rear wheel, respectively. Each of the friction brake mechanisms 22 includes a brake disc 22a and a brake caliper 22b. The brake disc 22a is secured to the respective wheel. The brake caliper 22b is secured to the body of the own vehicle. The brake actuators 21 adjust hydraulic pressure applied to wheel cylinders, depending on a command from the brake ECU 20. The wheel cylinders are provided in the respective brake calipers 22b. The brake actuators 21 activate the wheel cylinders with the adjusted hydraulic pressures to press brake pads to the respective brake discs 22a to generate friction braking forces.

The brake ECU 20 sets a driver-requested deceleration, based on the amount of pressing the brake pedal detected by the brake pedal operation amount sensor. The brake ECU 20 controls activations of the brake actuators 21 to decelerate the own vehicle at the driver-requested deceleration. In addition, the brake ECU 20 controls the activations of the brake actuators 21 to decelerate the own vehicle at a PCS-requested deceleration when the brake ECU 20 receives a PCS brake command sent from the driving assist ECU 10. The PCS-requested deceleration is information included in the PCS brake command.

The brake ECU 20 selects larger one of the driver-requested deceleration and the PCS-requested deceleration as the final requested deceleration when the brake pedal is operated while the brake ECU 20 receives the PCS brake command. The brake ECU 20 controls the activations of the brake actuators 21 to decelerate the own vehicle at the final requested deceleration. That is, the brake ECU 20 executes a brake override control.

The engine ECU 30 is electrically connected to engine actuators 31. The engine actuators 31 change operation states of an internal combustion engine 32. The engine actuators 31 include a throttle actuator which changes an opening degree of a throttle valve. The engine ECU 30 sets a driver-requested driving force, based on the amount of pressing the acceleration pedal detected by the acceleration pedal operation amount sensor. Hereinafter, the amount of pressing the acceleration pedal will be referred to as "the acceleration pedal pressing amount" or "the acceleration pedal operation amount." The engine ECU 30 controls activations of the engine actuators 31 to control a driving force or an actual driving force applied to the own vehicle to the driver-requested driving force.

The engine ECU 30 controls the activations of the engine actuators 31 to limit an output torque (or the driving force to be applied to the own vehicle) generated by the internal combustion engine 32 when the engine ECU 30 receives a driving force limitation command sent from the driving assist ECU 10. When the own vehicle is an electric vehicle, the engine actuators 31 are driving devices of electric motors. When the own vehicle is a hybrid vehicle, the engine actuators 31 are the above-mentioned engine actuators and the driving devices of the electric motors.

The meter ECU 40 is electrically connected to a display device 41. The meter ECU 40 causes the display device 41 to display images relating to driving assists in accordance with a display command from the driving assist ECU 10. The display device 41 may be a head-up display or a multi-information display which displays meters and various information.

The multi-media ECU 50 is electrically connected to a speaker 51. The mufti-media ECU 50 causes the speaker 51 to generate voice sound in accordance with a voice sound generation command sent from the driving assist ECU 10. The voice sound generation command sent from the driving assist ECU 10 includes information which specifies types of the voice sound. The driving assist ECU 10 selects the types of the voice sound, depending on a situation and sends the voice sound generation command specifying the selected types of the voice sound to the multi-media ECU 50. Thereby, predetermined types of the voice sound is generated by the speaker 51. The speaker 51 may be electrically connected to the meter ECU 40 in place of the multi-media ECU 50. In this case, the meter ECU 40 causes the speaker 51 to generate the voice sound in accordance with the voice sound generation command sent from the driving assist ECU 10.

<PCS Control Section>

Next, the PCS control section 11 will be described.

The PCS control section 11 determines the potential that the own vehicle collides with the standing object ahead of the own vehicle, based on (i) the front sensor information provided from the front sensors and (ii) vehicle states detected by the vehicle state sensors 80. For example, the PCS control section 11 performs a determination to determine whether the own vehicle potentially collides with the standing object if present moving state of the standing object (or present stopped state of the standing object when the standing object is a stationary object) is maintained, and present moving state of the own vehicle is maintained. When the PCS control section 11 determines that the own vehicle potentially collides with the standing object, the PCS control section 11 identifies the standing object as the obstacle, based on a result of the determination.

When the PCS control section 11 detects the obstacle, the PCS control section 11 calculates a predicted collision amount of time TTC. The predicted collision amount of time TTC is a predicted amount of time which the own vehicle takes to collide with the obstacle. The predicted collision amount of time TTC is calculated, based on a following equation (1), the distance d between the obstacle and the own vehicle, and the relative speed Vr of the own vehicle relative to the obstacle.

$$TTC=d/Vr \quad (1)$$

The predicted collision amount of time TTC is used as an index representing the level of the potential that the own vehicle collides with the obstacle. The level of the potential or risk that the own vehicle collides with the obstacle, increases as the predicted collision amount of time TTC decreases.

According to the PCS control of this embodiment, there are two levels of the potential that the own vehicle collides with the obstacle, based on the predicted collision amount of time TTC. The PCS control section 11 determines that the level of the potential that the own vehicle collides with the obstacle, reaches a first level and warns the driver, using the display device 41 and the buzzer 100 when the predicted collision amount of time TTC becomes equal to or shorter than a warning threshold TTCw.

When the predicted collision amount of time TTC decreases further to become equal to or shorter than an activation threshold TTCa (<TTCw), the PCS control section 11 determines that the level of the potential that the own vehicle collides with the obstacle, reaches a second level and starts to execute the autonomous braking control. In this case, the PCS control section 11 sends the PCS brake command to the brake ECU 20. The PCS brake command includes information on the PCS-requested deceleration Gpcs.

The PCS-requested deceleration Gpcs can be calculated as follows.

Assuming that the obstacle stops, a moving distance X which the own vehicle moves until the own vehicle stops, can be expressed by a following equation (2). In the equation (2), a symbol "V" is the moving speed of the own vehicle (=the relative speed of the own vehicle), a symbol "a" is a deceleration of the own vehicle (<0), and a symbol "t" is an amount of time which the own vehicle takes until the own vehicle stops.

$$X=V^{*}t+(\tfrac{1}{2})^{*}a^{*}t^2 \quad (2)$$

The amount of time t which the own vehicle takes until the own vehicle stops, can be expressed by a following equation (3).

$$t=-V/a \quad (3)$$

When the amount of time t calculated by the equation (3) is assigned to the amount of time t of the equation (2), the moving distance X which the own vehicle moves until the own vehicle stops, can be expressed by a following equation (4).

$$X=-V^2/2a \quad (4)$$

In order to stop the own vehicle by a distance β before the obstacle, the deceleration a should be calculated by setting the moving distance X to a distance (d−β) acquired by subtracting the distance β (>0) from the distance d detected by the front sensors. When the obstacle moves, the moving distance X is calculated, using the relative speed and the relative deceleration relative to the obstacle.

The deceleration a calculated as such is used as the PCS-requested deceleration Gpcs. There is an upper limit value Gmax (>0) for the PCS-requested deceleration Gpcs. Thus, when a magnitude (or an absolute value) of the calculated PCS-requested deceleration Gpcs exceeds the upper limit value Gmax, the magnitude of the PCS-requested deceleration Gpcs is set to the upper limit value Gmax.

When the brake ECU 20 receives the PCS brake command, the brake ECU 20 controls the activations of the brake actuators 21 to achieve the PCS-requested deceleration Gpcs. Thereby, the friction braking forces are generated on the left and right front wheels and the left and right rear wheels, and the own vehicle can be forcibly decelerated without a brake pedal operation by the driver.

As described above, the autonomous braking control is the control to generate the friction forces on the left and right front wheels and the left and right rear wheels in response to the PCS brake command and decelerate the own vehicle.

The PCS control section 11 determines whether the predicted collision amount of time TTC becomes larger than a termination threshold TTCb (TTC>TTCb) by the autonomous braking control. The termination threshold TTCb has been set to a value larger than the activation threshold TTCa. Therefore, the PCS control section 11 monitors whether the level of the potential that the own vehicle collides with the obstacle, decreases to a small level (i.e., whether the own vehicle has avoided a collision with the obstacle). When the PCS control section 11 determines that the level of the potential that the own vehicle collides with the obstacle, decreases to the small level, the PCS control section 11 terminates sending the PCS brake command. Thereby, an execution of the autonomous braking control is terminated, and an execution of the PCS control is terminated.

In addition, when the own vehicle is stopped by the autonomous braking control, the PCS control section 11 terminates sending the PCS brake command. Thereby, the execution of the autonomous braking control is terminated.

In this case, the PCS control section 11 sends a stopped state keeping command to the brake ECU 20 after the execution of the autonomous braking control is terminated. While the brake ECU 20 receives the stopped state keeping command, the brake ECU 20 controls the activations of the brake actuators to apply the hydraulic pressure set for keeping the own vehicle stopped to the wheel cylinders of the friction brake mechanisms of the left and right front wheels and the left and right rear wheels. Thereby, the stopped state of the own vehicle is maintained such that the own vehicle does not move forward nor rearward. When a stopped state keeping termination condition is satisfied, the PCS control section 11 terminates sending the stopped state keeping command. Thereby, applying the hydraulic pressure to the wheel cylinders is terminated, and keeping the own vehicle stopped is terminated.

The stopped state keeping termination condition is satisfied when any one of (i) a condition that an amount of time for which the own vehicle is kept stopped, reaches a predetermined amount of time (a condition 1) or (ii) a condition that an operation of pressing the brake pedal is detected (a condition 2), is satisfied.

The PCS control section 11 sends the driving force limitation command to limit the engine output torque (for example, to decrease the engine output torque to zero) to the engine ECU 30 while the PCS control section 11 executes the autonomous braking control or keeps the own vehicle stopped. Thereby, even when the driver operates the acceleration pedal while the autonomous braking control is being executed, the driver-requested driving force is overridden. Thus, the own vehicle is not accelerated in response to the operation applied to the acceleration pedal. Hereinafter, a control to keep the own vehicle stopped will be referred to as "a stopped state keeping control."

<Mistaken Pressing Solving Control Section>

Next, the mistaken pressing solving control section 12 will be described. The mistaken pressing solving control section 12 executes a mistaken pressing determination process and a warning process. The mistaken pressing determination process is a process to determine whether a mistaken pressing operation occurs. The mistaken pressing operation is an operation performed by the driver to mistakenly to deeply press the acceleration pedal with an intention to press the brake pedal. The warning process is a process to warn the driver with limiting the driving force applied to the own vehicle.

The mistaken pressing solving control section 12 has memorized predetermined mistaken pressing determination conditions. When the predetermined mistaken pressing determination conditions are satisfied, the mistaken pressing solving control section 12 determines or presumes that the driver's mistaken pressing operation occurs.

The mistaken pressing solving control section 12 uses the mistaken pressing determination conditions E1 to E3 below to determine whether the mistaken pressing operation occurs.

E1: An amount of time elapsing since an acceleration pedal pressing rate determination becomes "ON", is shorter than or equal to a predetermined amount of time (e.g., 0.5 seconds). The acceleration pedal pressing rate determination will be described later.

E2: An autonomous braking activating determination flag F is "0."

E3: The acceleration pedal pressing amount AP is larger than or equal to a threshold APa (AP≥APa). The threshold APa is a value larger than a threshold APb described later.

When the mistaken pressing determination conditions E1 to E3 are satisfied (an AND condition is satisfied), the mistaken pressing solving control section 12 determines that the mistaken pressing operation occurs. Hereinafter, a mistaken pressing determination result representing that the mistaken pressing operation is determined to occur, will be referred to as "Mistaken Pressing Determination: ON." In addition, the mistaken pressing determination result that the mistaken pressing operation is not determined to occur, will be referred to as "Mistaken Pressing Determination: OFF."

The acceleration pedal pressing rate determination of the mistaken pressing determination condition E1 is set to "ON" when following pressing rate determination conditions E1-1, E1-2, E1-3, and E1-4 are all satisfied (AND condition). On the other hand, the acceleration pedal pressing rate determination of the mistaken pressing determination condition E1 is set to "OFF" when any one of the pressing rate determination conditions E1-1, E1-2, E1-3, and E1-4 is not satisfied.

E1-1: The acceleration pedal pressing amount AP is larger than or equal to the threshold APb (AP≥APb).

E1-2: The acceleration pedal pressing rate APV is larger than or equal to a threshold APVc (APV≥APVc).

E1-3: An amount of time Tboff for which the brake switch continues to be in an OFF state, is longer than or equal to a threshold second Tx (Tboff≥Tx).

E1-4: An amount of time Twoff for which the blinkers continues being disactivated, is longer than or equal to a threshold second Ty (Twoff≥Ty).

The acceleration pedal pressing amount AP represents the amount of pressing of the acceleration pedal or the accelerator position detected by the acceleration pedal operation amount sensor. The acceleration pedal pressing rate APV represents a change amount of the acceleration pedal pressing amount AP per unit amount of time.

The threshold APb is a threshold of the acceleration pedal pressing amount used for determining whether the mistaken pressing operation occurs. The threshold APVc is a threshold of the acceleration pedal pressing rate for determining whether the mistaken pressing operation occurs. These thresholds are set to values capable of detecting the operation of rapidly pressing the acceleration pedal. Therefore, using the pressing rate determination conditions E1-1 and E1-2 enables to detect the operation of rapidly pressing the acceleration pedal by the driver.

The pressing rate determination condition E1-3 is for setting a lower limit of the amount of time Tboff for which the brake pedal continues not to be operated from a point of time when the driver releases the brake pedal. For example, when the driver has not operated the brake pedal for a long time, the driver may not exactly distinguish between the acceleration pedal and the brake pedal. Therefore, when the amount of time elapsing from the point of time when the driver releases the brake pedal, is large, and the pressing rate determination conditions E1-1 and E1-2 are satisfied, the level of the potential that the mistaken pressing operation occurs, is high. For the reasons, the pressing rate determination condition E1-3 is provided.

The pressing rate determination condition E1-4 is for setting a lower limit of the elapsing amount of time Twoff for which the blinkers continue being disactivated. For example, immediately after the left blinkers or the right blinders change from an ON state (a blinking state) to an OFF state (a turned-off state), a potential that the own vehicle is overtaking a preceding vehicle or is moving on a curve, is high. In these situations, the driver intentionally and strongly operates the acceleration pedal. On the other hand, when a long time has elapsed from a point of time when the blinkers are disactivated, and the pressing rate determination conditions E1-1 and E1-2 are satisfied, the mistaken pressing operation is likely to occur. For the reasons, the pressing rate determination condition E1-4 is provided.

The mistaken pressing determination condition E2 is a condition that the autonomous braking control is not executed by the PCS control section 11. The PCS control section 11 outputs the autonomous braking activating determination flag F which is a signal representing whether the autonomous braking control is being executed. The autonomous braking activating determination flag F represents that the autonomous braking control is not executed by "0", and represents that the autonomous braking control is being executed by "1." The mistaken pressing solving control section 12 reads the autonomous braking activating determination flag F and determines whether the mistaken pressing determination condition E2 is satisfied.

The mistaken pressing determination condition E3 is a condition for determining whether the acceleration pedal pressing amount AP further increases to become equal to or larger than the threshold APa within a predetermined amount of time after the acceleration pedal pressing rate determination becomes "ON." When the driver performs the mistaken pressing operation, the acceleration pedal pressing amount increases even after the acceleration pedal pressing rate APV becomes equal to or larger than the threshold APVc (i.e., after the pressing rate determination condition E1-2 becomes satisfied). This is because the driver may become panicked and strongly press the acceleration pedal. The mistaken pressing determination condition E3 uses the threshold APa set to a value larger than the threshold APb and determines whether the acceleration pedal pressing amount AP is equal to or larger than the threshold APa.

After the mistaken pressing solving control section 12 determines that the mistaken pressing operation occurs, the mistaken pressing solving control section 12 maintains this determination result until an acceleration pedal releasing operation performed by the driver is detected. For example, when the mistaken pressing solving control section 12 detects that the acceleration pedal pressing amount AP becomes equal to or smaller than an acceleration pedal releasing determination threshold APend (for example, 10 percent accelerator position), the mistaken pressing solving control section 12 returns the mistaken pressing determination result to "Mistaken Pressing Determination OFF".

<Mistaken Pressing Determination Routine>

Figure 2:
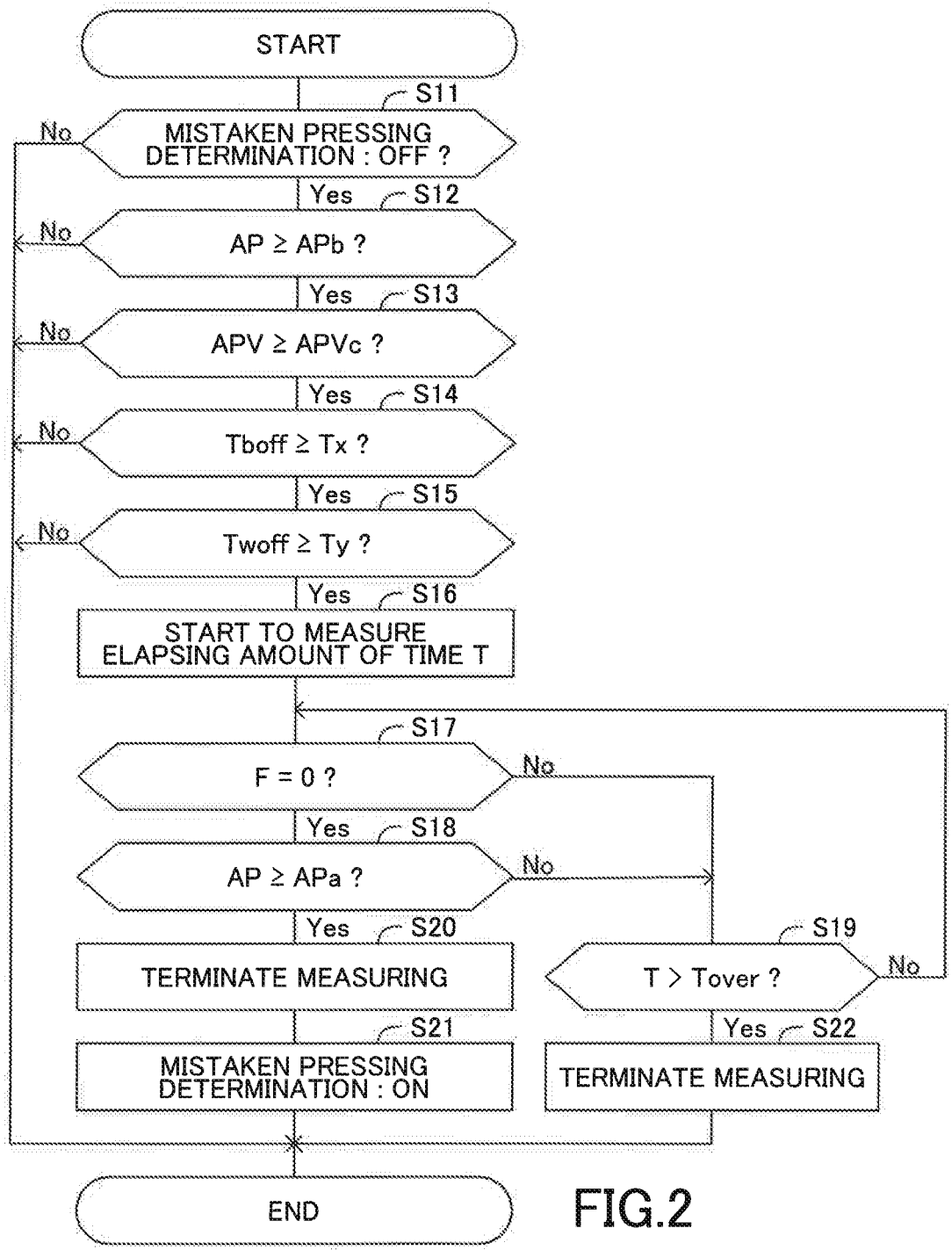
FIG. 2 is a view which shows a flowchart of a mistaken pressing determination routine.

FIG. 2 shows a mistaken pressing determination routine which concretely shows the mistaken pressing determination process executed by the mistaken pressing solving control section 12 by a flowchart. The mistaken pressing solving control section 12 executes the mistaken pressing determination routine with a predetermined calculation cycle.

At a step S11, the mistaken pressing solving control section 12 determines whether the mistaken pressing determination result is "Mistaken Pressing Determination: OFF". When the mistaken pressing determination result is "Mistaken Pressing Determination: OFF", the mistaken pressing solving control section 12 executes determination processes of a step S12 and steps following it. An initial value of the mistaken pressing determination result is "Mistaken Pressing Determination: OFF".

At the steps S12 to S15, the mistaken pressing solving control section 12 determines whether the pressing rate determination conditions E1-1, E1-2, E1-3, and E1-4 are satisfied. The process of the step S12 is a process to determine whether the pressing rate determination condition E1-1 is satisfied. The process of the step S13 is a process to determine whether the pressing rate determination condition E1-2 is satisfied. The process of the step S14 is a process to determine whether the pressing rate determination condition E1-3 is satisfied. The process of the step S15 is a process to determine whether the pressing rate determination condition E1-4 is satisfied.

When any one of the pressing rate determination conditions E1-1 to E1-4 of the steps S12 to S15 is not satisfied, the mistaken pressing solving control section 12 terminates executing the mistaken pressing determination routine once. When the pressing rate determination conditions E1-1 to E1-4 are all satisfied while the mistaken pressing solving control section 12 repeatedly executes the mistaken pressing determination routine with the predetermined calculation cycle, the mistaken pressing solving control section 12 proceeds with the process to a step S16 to start to measure an elapsing amount of time T by a timer.

Next, at a step S17, the mistaken pressing solving control section 12 determines whether the autonomous braking activating determination flag F is "0" (the mistaken pressing determination condition E2). When the autonomous braking activating determination flag F is "0", the mistaken pressing solving control section 12 proceeds with the process to a step S18 to determine whether the acceleration pedal pressing amount AP is larger than or equal to the threshold APa (the mistaken pressing determination condition E3).

When a determination at the step S17 or the step S18 is "No", the mistaken pressing solving control section 12 proceeds with the process to a step S19 to determine whether the elapsing amount of time T measured by the timer exceeds a predetermined amount of time Tover (for example, 0.5 seconds). When the elapsing amount of time T is smaller than or equal to the predetermined amount of time Tover, the mistaken pressing solving control section 12 returns the process to the step S17 and repeatedly executes the above-described processes.

When the mistaken pressing determination conditions E2 and E3 are both satisfied (S17: Yes, S18: Yes) until the elapsing amount of time T reaches the predetermined amount of time Tover while the above-described processes are repeatedly executed, the mistaken pressing solving control section 12 proceeds with the process to a step S20 to terminate measuring the elapsing amount of time T. The mistaken pressing solving control section 12 proceeds with the process to a step S21 to set the mistaken pressing determination result to "Mistaken Pressing Determination: ON" and terminates executing the mistaken pressing determination routine.

On the other hand, when the elapsing amount of time T exceeds the predetermined amount of time Tover (S19: Yes) before the mistaken pressing determination condition E2 or E3 is satisfied, the mistaken pressing solving control section 12 proceeds with the process to a step S22 to terminate measuring the elapsing amount of time T and terminates executing the mistaken pressing determination routine.

<Mistaken Pressing Determination Cancellation Routine>

Figure 3:
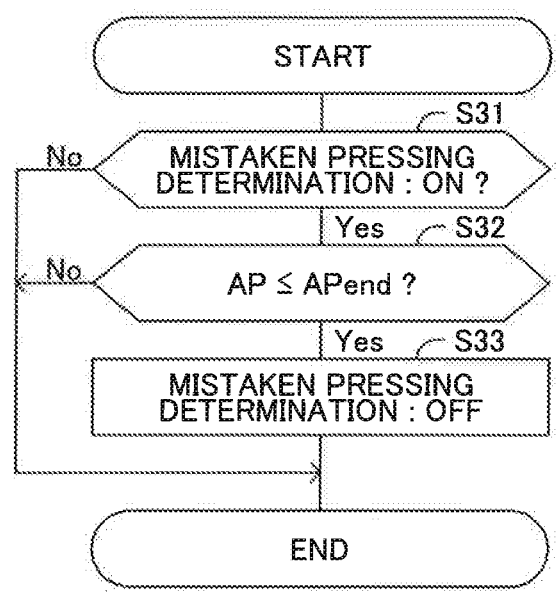
FIG. 3 is a view which shows a flowchart of a mistaken pressing determination cancellation routine.

The mistaken pressing solving control section 12 executes a mistaken pressing determination cancellation routine shown in FIG. 3 to execute a process to return the mistaken pressing determination result to "Mistaken Pressing Determination: OFF" from "Mistaken Pressing Determination: ON". The mistaken pressing determination cancellation routine is executed with the predetermined calculation cycle in parallel with the mistaken pressing determination routine (FIG. 2).

When the mistaken pressing solving control section 12 starts to execute the mistaken pressing determination cancellation routine, the mistaken pressing solving control section 12 proceeds with the process to a step S31 to determine whether the mistaken pressing determination result is "Mistaken Pressing Determination: ON". When the mistaken pressing determination result is "Mistaken Pressing Determination: OFF", the mistaken pressing solving control section 12 terminates executing the mistaken pressing determination cancellation routine once. When the mistaken pressing determination result is "Mistaken Pressing Determination: ON", the mistaken pressing solving control section 12 proceeds with the process to a step S32 to determine whether a mistaken pressing determination termination condition is satisfied. In this case, the mistaken pressing solving control section 12 determines whether the acceleration pedal pressing amount AP becomes smaller than or equal to the acceleration pedal releasing determination threshold APend (for example, 10 percent accelerator position). When the acceleration pedal pressing amount AP does not become smaller than or equal to the acceleration pedal releasing determination threshold APend, the mistaken pressing solving control section 12 terminates executing the mistaken pressing determination cancellation routine once. When the acceleration pedal pressing amount AP becomes smaller than or equal to the acceleration pedal releasing determination threshold APend (S32: Yes) while the mistaken pressing solving control section 12 repeatedly executes the above-described processes, the mistaken pressing solving control section 12 proceeds with the process to a step S33 to set the mistaken pressing determination result to "Mistaken Pressing Determination: OFF" and terminates executing the mistaken pressing determination cancellation routine.

<Driving Force Limitation Control>

The mistaken pressing solving control section 12 maintains the driving force applied to the own vehicle at a smaller value than ordinary times while the mistaken pressing determination result is "Mistaken Pressing Determination: ON". In the ordinary times, the engine ECU 30 sets the driver-requested driving force depending on the acceleration pedal operation amount (target driving force), based on a driver-requested driving force map and controls the activations of the engine actuators 31 to control the driving force applied to the own vehicle (actual driving force) to the driver-requested driving force. The driver-requested driving force map is data which associates the acceleration pedal operation amount with the driver-requested driving force such that the driver-requested driving force increases as the acceleration pedal operation amount increases.

Figure 4:
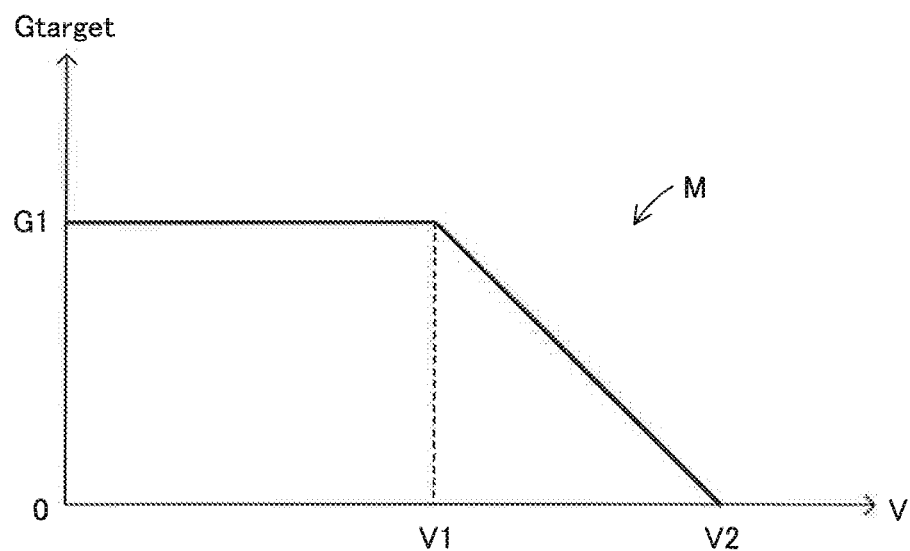
FIG. 4 is a view which shows a graph of a target limited acceleration map.

On the other hand, when the mistaken pressing operation is detected, the mistaken pressing solving control section 12 sends the driving force limitation command to the engine ECU 30. Thereby, the engine ECU 30 sets the target driving force as described below. The engine ECU 30 has memorized a target limited acceleration map M shown in FIG. 4. The target limited acceleration map M is data which associates the present vehicle moving speed V detected by the vehicle moving speed sensor with a target limited acceleration Gtarget. The target limited acceleration map M has a property to (i) set the target limited acceleration Gtarget to a constant value G1 when the vehicle moving speed V is within a range from zero to a first vehicle moving speed V1 and (ii) linearly decrease the target limited acceleration Gtarget from the constant value G1 to zero as the vehicle moving speed V increases when the vehicle moving speed V is within a low moving speed range higher than the first vehicle moving speed V1 and equal to or smaller than a second vehicle moving speed V2.

When the engine ECU 30 receives the driving force limitation command, the engine ECU 30 sets the target driving force, using the target limited acceleration map M as described below.

The engine ECU 30 calculates a target limited driving force, depending on a difference (Gtarget−G) between (i) the target limited acceleration Gtarget depending on the present vehicle moving speed V and set by the target limited acceleration map M and (ii) the present acceleration G of the own vehicle detected by the acceleration sensor. Hereinafter, the acceleration G of the own vehicle detected by the acceleration sensor will be referred to as "the actual acceleration G." The target limited driving force is calculated by a feedback control (for example, the P control, the PI control, the PID control, etc.) which controls the difference (Gtarget−G) to zero. In the target limited acceleration map M, the target limited acceleration Gtarget which does not rapidly accelerate the own vehicle, is set. Therefore, even when the driver performs an operation to deeply press the acceleration pedal, the target limited driving force is not set to a large value.

The engine ECU 30 compares the driver-requested driving force set, based on the driver-requested driving force map and the target limited driving force with each other, selects a smaller one of them, and sets the value of the selected driving force as the final target driving force. Therefore, the target driving force is set to a value limited to the target limited driving force as an upper limit, compared with the driver-requested driving force. The engine ECU 30 controls the activations of the engine actuators 31 to control the driving force generated by the internal combustion engine 32 and applied to the own vehicle (actual driving force) to the target driving force limited as described above.

Therefore, when the mistaken pressing operation is detected, the driving force generated by the internal combustion engine 32 and applied to the own vehicle is made smaller than the ordinary times by an upper limit value limitation to the target driving force. Thereby, an undesired behavior (for example, a rapid acceleration) of the own vehicle is prevented. As described above, a control to limit the target driving force (the driving force generated by the internal combustion engine 32 and applied to the own vehicle), compared with the ordinary times, will be referred to as "the driving force limitation control."

<Mistaken Pressing Warning>

The mistaken pressing solving control section 12 sends the voice sound generation command for a mistaken pressing warning to the multi-media ECU 50, outputs the buzzer drive signal to the buzzer 100, and sends the display command for mistaken pressing warning to the meter ECU 40 while the mistaken pressing determination result is "Mistaken Pressing Determination: ON".

The multi-media ECU 50 causes the speaker 51 to generate the voice sound for the mistaken pressing warning in accordance with the voice sound generation command. The voice sound is a massage "The acceleration pedal is pressed. Please release the acceleration pedal." The multi-media ECU 50 repeatedly generates the voice sound from the speaker 51 while the multi-media ECU 50 receives the voice sound generation command, that is, while the mistaken pressing determination result is "Mistaken Pressing Determination: ON". The buzzer 100 activates in response to the buzzer drive signal to generate warning sound (for example, buzzer sound such as bleep, bleep, bleep).

In addition, the meter ECU 40 causes the display device 41 to display the character message "The acceleration pedal is pressed. Please release the acceleration pedal." which is the same content as the voice sound.

Hereinafter, a warning performed when the mistaken pressing operation is detected (in particular, when the mistaken pressing operation is determined to be performed), will be "the mistaken pressing warning."

Two types of the mistaken pressing warning such as a first mistaken pressing warning and a second mistaken pressing warning are prepared as the mistaken pressing warning. The mistaken pressing warning is changed from the first mistaken pressing warning to the second mistaken pressing warning at a predetermined timing described later.

<Mistaken Pressing Warning Manner Change Control>

When the mistaken pressing operation is detected, the driver has an intention to press the brake pedal. Thus, the driver may be surprised and become panicked by the moving of the own vehicle different from the intention of the driver and continue pressing the acceleration pedal. In this case, it is necessary to make the driver release the acceleration pedal as soon as possible. Therefore, it is important to warn the driver in a manner to concentrate the driver's attention on the acceleration pedal releasing operation.

Also, in such a case, the own vehicle may rapidly approach the obstacle, and the execution of the autonomous braking control may be started. After the own vehicle is stopped by the autonomous braking control, the driver may calm down gradually. In this case, an emergency level decreases. Thus, it is important to calm the driver more and warn the driver in a manner to make the driver take a proper action, that is, in a manner to prompt the driver to perform an operation of pressing the brake pedal.

According to this embodiment, a manner of performing the mistaken pressing warning is changed, depending on a change of mental state of the driver when the mistaken pressing operation is detected, and the execution of the autonomous braking control is started while the mistaken pressing warning is being performed.

Hereinafter, a situation that the mistake pressing operation is detected, and the execution of the autonomous braking control is started while the mistaken pressing warning is being performed, will be referred to as "a particular situation." In addition, a control process to change the manners of performing the mistaken pressing warning in the particular situation, will be referred to as "a mistaken pressing warning manner change control."

Figure 5:
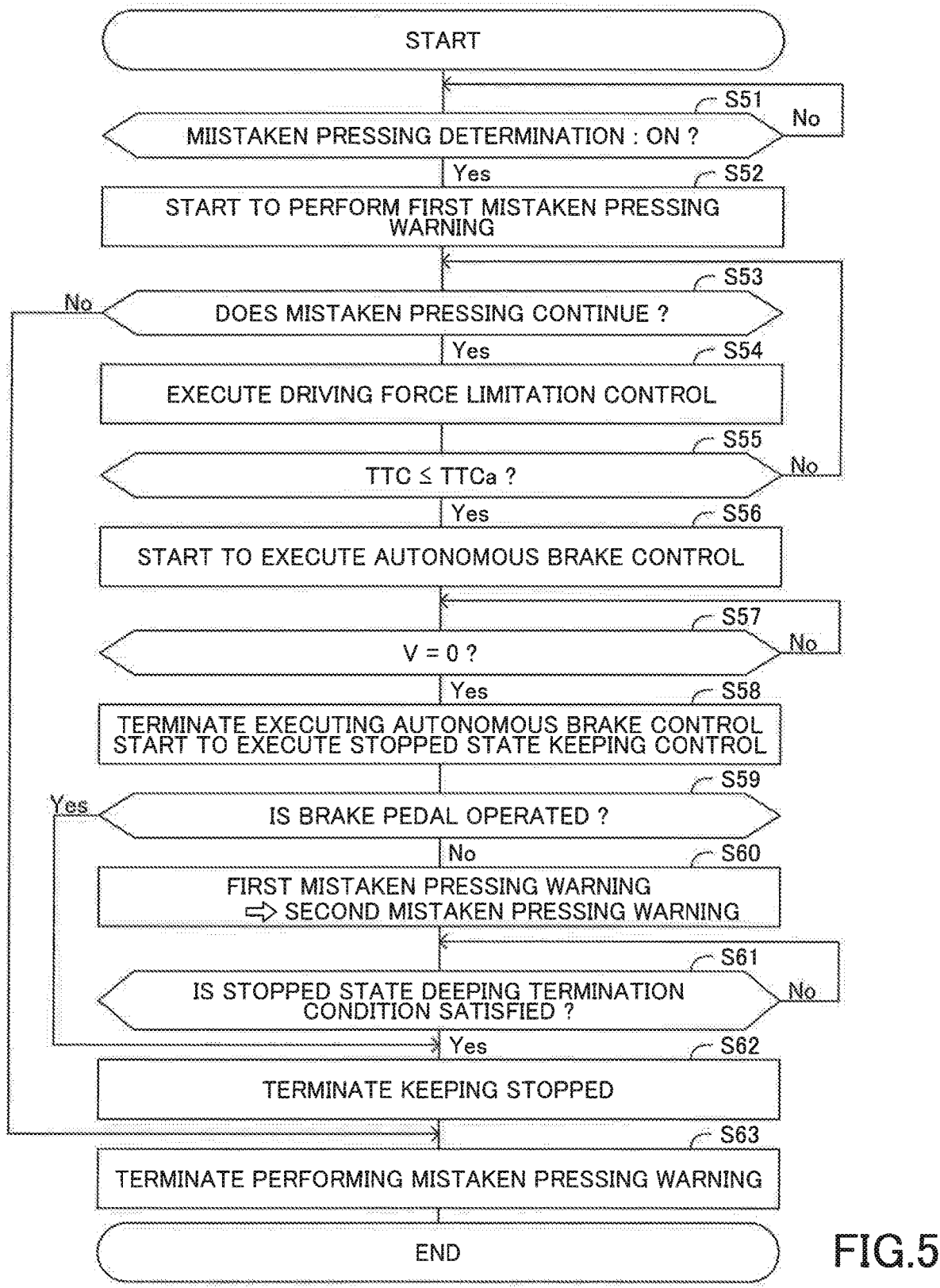
FIG. 5 is a view which shows a flowchart of a mistaken pressing warning manner change routine.

FIG. 5 shows a flowchart for describing the mistaken pressing warning manner change control which will be referred to as "the mistaken pressing warning manner change routine." An execution of the mistaken pressing warning manner change control is related to the autonomous braking control and the stopped state keeping control. Thus, although the mistaken pressing warning manner change control is executed by the mistaken pressing solving control section 12, the mistaken pressing warning manner change routine partially includes the autonomous braking control and the stopped state keeping control. Therefore, the mistaken pressing warning manner change routine will be described as a process executed by the driving assist ECU 10 (the PCS control section 11 and the mistaken pressing solving control section 12).

When the execution of the mistaken pressing warning manner change routine is started, the driving assist ECU 10 proceeds with the process to a step S51 to determine whether the mistaken pressing operation occurs. In this case, the driving assist ECU 10 determines whether the mistaken pressing determination result is "Mistaken Pressing Determination: ON", that is, whether the mistaken pressing operation is performed. When the driving assist ECU 10 determines that the mistaken pressing determination result is "Mistaken Pressing Determination: OFF", that is, the mistaken pressing operation does not occur, the driving assist ECU 10 returns the process to the step S51. Therefore, a determination process of the step S51 is repeatedly executed until the mistaken pressing determination result changes to "Mistaken Pressing Determination: ON".

When the mistaken pressing determination result is "Mistaken Pressing Determination: ON" (S51: Yes) while the above-described process is repeatedly executed, the driving assist ECU 10 proceeds with the process to a step S52 to start to perform the first mistaken pressing warning. When the driving assist ECU 10 starts to perform the first mistaken pressing warning, the driving assist ECU 10 sends the voice sound generation command for the first mistaken pressing warning to the multi-media ECU 50, outputs the buzzer drive signal to the buzzer 100, and sends the display command for the first mistaken pressing warning to the meter ECU 40. Thereby, the voice sound "The acceleration pedal is pressed. Please release the acceleration pedal." is generated from the speaker 51. Hereinafter, this voice sound will be referred to as "the first voice sound." In addition, the character message having the same contents as the contents of the first voice sound, is displayed on the display device 41. In addition, the buzzer 100 generates the buzzer sound.

The first voice sound generation is performed at a predetermined first voice volume at a predetermined first voice sound generation rate. Further, the first voice sound generation is repeatedly performed with a first voice sound generation cycle. For example, an interval (T1) is set such that the (n+1)th time first voice sound generation is started at a point of time when a first predetermined amount of time T1 elapses after the nth time first voice sound generation is terminated (n=1, 2, 3, . . . ).

When the mistaken pressing operation occurs, the own vehicle rapidly accelerates contrary to the driver's intention. Thus, the driver may be likely to become panicked. Therefore, in order to make the driver release the acceleration pedal as soon as possible (that is, in order to make the driver concentrate on the acceleration pedal releasing operation), the content described above prompts the driver to perform the acceleration pedal releasing operation, and the first voice sound generation is performed at a large volume at a high voice sound generation rate with a short cycle. In particular, the first voice sound volume is set to a large volume such that the driver can catch the voice sound even when the driver is panicked. The first voice sound generation rate and the first voice sound generation cycle are set to a high voice sound generation rate and a short cycle, respectively so as to promptly inform the driver that the driver needs to release the acceleration pedal.

Next, the driving assist ECU 10 proceeds with the process to a step S53 to determine whether a state that the acceleration pedal is pressed, continues. For example, when the acceleration pedal pressing amount AP becomes smaller than or equal to the acceleration pedal releasing determination threshold APend (for example, 10 percent accelerator position), the mistaken pressing determination result changes to "Mistaken Pressing Determination: OFF". At the step S53, whether the state that the mistaken pressing determination result is "Mistaken Pressing Determination: ON" continues, is determined.

When the mistaken pressing operation continues (S53 Yes), the driving assist ECU 10 proceeds with the process to a step S54 to execute the above-described driving force limitation control. Thereby, the rapid acceleration of the own vehicle can be prevented.

Next, the driving assist ECU 10 proceeds with the process to a step S55 to determine whether (i) the obstacle is detected, and (ii) the level of the potential that the own vehicle collides with the detected obstacle, is high. In this case, the driving assist ECU 10 determines whether the predicted collision amount of time TTC becomes shorter than or equal to the activation threshold TTCa for starting to execute the autonomous braking control (TTC≤TTCa).

When the predicted collision amount of time TTC is longer than the activation threshold TTCa, the driving assist ECU 10 returns the process to the step S53 to repeated execute the above-described processes (S53 to S55). When the own vehicle approaches the obstacle, and the predicted collision amount of time TTC becomes equal to or smaller than the activation threshold TTCa (S55: Yes) while the above-described processes are repeatedly executed, the driving assist ECU 10 proceeds with the process to a step S56 to start to execute the autonomous braking control. Thereby, the friction braking forces are generated on the left and right front wheels and the left and right rear wheels, respectively, and the own vehicle starts to decelerate even when the driver does not operate the brake pedal.

Next, the driving assist ECU 10 proceeds with the process to a step S57 to read the vehicle moving speed V detected by the vehicle moving speed sensor and determine whether the own vehicle stopped (V=0). The driving assist ECU 10 continues executing the autonomous braking control until the own vehicle is stopped by the autonomous braking control. When the driving assist ECU 10 confirms that the own vehicle stops (S57: Yes), the driving assist ECU 10 proceeds with the process to a step S58. When the driving assist ECU 10 proceeds with the process to the step S58, the driving assist ECU 10 terminates executing the autonomous braking control and sends the stopped state keeping command to the brake ECU 20. Thereby, the execution of the stopped state keeping control is started, and the topped state keeping hydraulic pressure is applied to the wheel cylinders of the friction brake mechanisms 22 of the left and right front wheels and the left and right rear wheels to keep the own vehicle stopped.

Next, the driving assist ECU 10 proceeds with the process to a step S59 to determine whether the brake operation is performed. For example, the driving assist ECU 10 determines whether the brake switch is in the ON state. Alternatively, the driving assist ECU 10 may determine whether a detection value detected by the brake pedal operation amount sensor is larger than or equal to a brake operation determination threshold or may acquire a measurement value of the actual brake oil pressure and determine whether the brake oil pressure exceeds a threshold.

When the brake operation is not performed (S59: No), the driving assist ECU 10 proceeds with the process to a step 60 to change the mistaken pressing warning from the first mistaken pressing warning to the second mistaken pressing warning. In this case, the driving assist ECU 10 changes the voice sound generation command from the voice sound generation command for the first mistaken pressing warning sent to the multi-media ECU 50 to the voice sound generation command for the second mistaken pressing warning and changes the display command from the display command for the first mistaken pressing warning sent to the meter ECU 40 to the display command for the second mistaken pressing warning.

Thereby, the voice sound "The acceleration pedal is pressed. Please press the brake pedal." is generated from the speaker 51. Hereinafter, this voice sound will be referred to as "the second voice sound." In addition, the character message having the same content as the content of the second voice sound is displayed on the display device 41.

The second voice sound generation is performed at a predetermined second voice sound volume at a predetermined second voice sound generation rate. The predetermined second voice sound volume has been set to a volume smaller than the first voice sound volume. The second voice sound generation rate has been set to a rate smaller than the first voice sound generation rate.

The second voice sound generation is also repeatedly performed. The second voice sound generation is repeatedly performed with a second voice sound generation cycle. The second voice sound generation cycle has been set to a cycle longer than the first voice sound generation cycle. For example, an interval (T2) is set such that the (n+1)th time second voice sound generation is started at a point of time when a second predetermined amount of time T2 elapses after the nth time second voice sound generation is terminated (n=1, 2, 3, . . . ). The second predetermined amount of time T2 has been set to an amount of time longer than the first predetermined amount of time T1. The second voice sound generation cycle is longer than the first voice sound generation cycle since the second voice sound generation rate is smaller than the first voice sound generation rate, and the second predetermined amount of time T2 is longer than the first predetermined amount of time T1.

After the own vehicle is stopped by the autonomous braking control, the driver may become calmed gradually. In this case, the emergency level decreases. Thus, it is important to calm the driver more not to have a sense of urgency and warn the driver so as to make the driver take a proper action.

Accordingly, at the step S60, the volume of the second voice sound is set to a volume smaller than the volume of the first voice sound, the generation rate of the second voice sound is set to a rate smaller than the generation rate of the first voice sound, the generation cycle of the second voice sound is set to a cycle shorter than the generation cycle of the first voice sound. Thereby, the gentle voice sound is generated not to make the driver nervous. Thereby, it is possible to prompt the driver to properly perform the brake pedal pressing operation.

The buzzer sound of the second mistaken pressing warning may be the same as the buzzer sound of the first mistaken pressing warning or may have a volume smaller than the volume of the buzzer sound of the first mistaken pressing warning. In addition, when the buzzer sound is generated intermittently (for example, bleep, bleep, bleep), the generation cycle of the buzzer sound of the second mistaken pressing warning may be longer than the generation cycle of the buzzer sound of the first mistaken pressing warning.

Next, the driving assist ECU 10 proceeds with the process to a step S61 to determine whether the stopped state keeping termination condition is satisfied. The driving assist ECU 10 repeatedly executes a process of the step S61 until the stopped state keeping termination condition becomes satisfied.

When the stopped state keeping termination condition becomes satisfied (S61: Yes), the driving assist ECU 10 proceeds with the process to a step S62 to terminate sending the stopped state keeping command. Thereby, keeping the own vehicle stopped is terminated.

Next, the driving assist ECU 10 proceeds with the process to a step S63 to terminate performing the mistaken pressing warning and terminate executing this routine. Thereby, the second mistaken pressing warning is terminated.

When the execution of the autonomous braking control is not started, and the acceleration pedal releasing operation is detected after the first mistaken pressing warning is started (S53: No), the driving assist ECU 10 proceeds with the process to a step S63 to terminate performing the mistaken pressing warning and terminate executing this routine. Thereby, the first mistaken pressing warning is terminated.

When the brake operation is detected at the step S59 (S59: Yes), the driving assist ECU 10 proceeds with the process to a step S62 to terminate keeping the own vehicle stopped.

According to the driving assist apparatus according to the embodiment described above, effects described below can be obtained.

Figure 6:
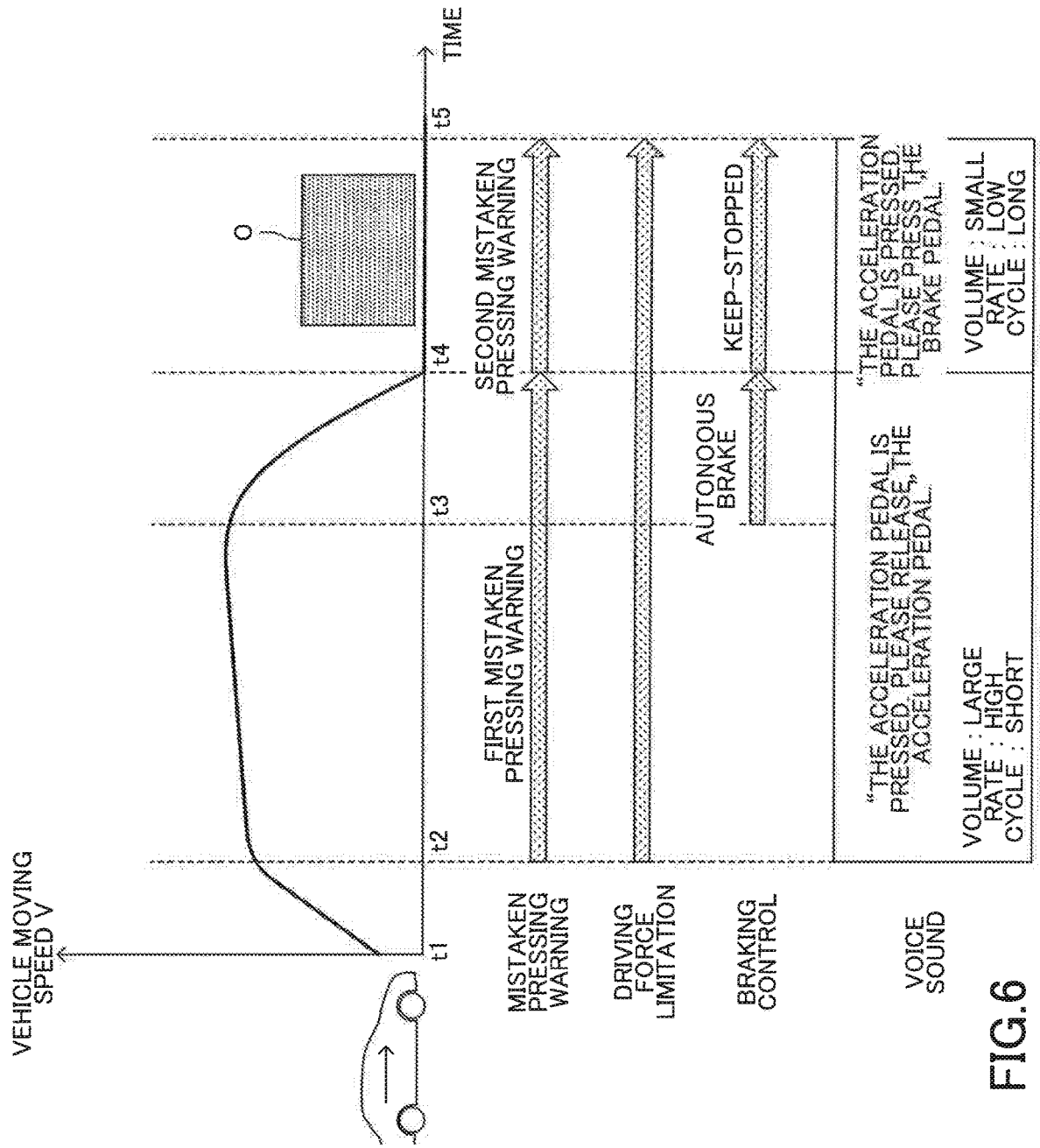
FIG. 6 is a view which shows a timing chart illustrating a timing of changing a mistaken pressing warning manner.

As shown in FIG. 6, the own vehicle rapidly accelerates when the driver performs the mistaken pressing operation at a point of time t1. Thereby, the mistaken pressing operation determination condition becomes satisfied at a point of time t2, and the first mistaken pressing warning and the execution of the driving force limitation control are started. The driver is alerted by the voice sound and the character display to prompt the driver to perform the acceleration pedal releasing operation by the first mistaken pressing warning. The voice sound generation is repeatedly performed at the large volume at the large rate with the short cycle. Thereby, it is possible to concentrate the driver to release the acceleration pedal.

When the first mistaken pressing warning is performed, the own vehicle approaches the obstacle O, and the predicted collision amount of time TTC reaches the activation threshold TTCa, the execution of the autonomous braking control is started (a point of time t3). When the state of the own vehicle changes from the moving state to the stopped state (the stopped state keeping state) by the autonomous braking control, the mistaken pressing warning is changed from the first mistaken pressing warning to the second mistaken pressing warning (a point of time t4). In addition, the execution of the autonomous braking control is terminated, and the execution of the stopped state keeping control is started. The engine output torque is controlled to zero while the autonomous braking control and the stopped state keeping control are executed.

The driver is alerted by the voice sound and the character display to prompt the driver to perform the brake pedal pressing operation by the second mistaken pressing warning. The voice sound generation of the second mistaken pressing warning is repeatedly performed at the smaller volume at the smaller rate with the longer cycle, compared with the voice sound generation of the first mistaken pressing warning. Thereby, it is possible to calm the driver and prompt the driver to perform a proper operation (the brake pedal pressing operation). Thereafter, when the stopped state keeping termination condition becomes satisfied at a point of time t5, the execution of the stopped state keeping control is terminated, and the execution of the second mistaken pressing warning is terminated.

The driving assist apparatus according to the embodiment has been described. The invention is not limited to the above-described embodiment. Various modification can be applied to the embodiment without departing from the object of the invention.

For example, according to the embodiment, whether the mistaken pressing operation occurs, is determined, based on the mistaken pressing determination conditions E1 to E3. However, the invention is not limited to use the mistaken pressing determination conditions E1 to E3. For example, the mistaken pressing determination conditions preferably include at least a condition that the acceleration pedal pressing amount AP is larger than or equal to the threshold APb (AP≥APb), and the acceleration pedal pressing rate APV is larger than or equal to the threshold APVc (APV≥APVc).

For example, the mistaken pressing determination condition E1 may include the pressing rate determination condition E1-2 without the pressing rate determination conditions E1-1, E1-3, and E1-4. In addition, the mistaken pressing determination condition E1 may include a condition that the pressing rate determination conditions E1-2 and E1-1 are both satisfied.

For example, according to the embodiment, the warning by the voice sound and the warning by the character display are both performed as the warning to prompt the driver to perform a proper pedal operation. The invention is not limited to perform both of the warning by the voice sound and the warning by the character display. Only the warning by the voice sound may be performed. Alternatively, only the warning by the character display may be performed. In either cases, the warning manner may be changed when the state of the own vehicle changes from the moving state to the stopped state.

Further, according to the embodiment, the voice sound volume, the voice sound generation rate, and the voice sound generation cycle are changed when the mistaken pressing warning is changed from the first mistaken pressing warning to the second mistaken pressing warning. In this regard, at least one of the voice sound volume, the voice sound generation rate, and the voice sound generation cycle may be changed. Alternatively, only the manner of performing the character display may be changed (the contents displayed by the characters are changed) without changing the manner of generating the voice sound. Alternatively, only the manner of generating the voice sound may be changed without changing the manner of performing the character display.

What is claimed is:

1. A driving assist apparatus, comprising:
at least one sensor which detects an obstacle surrounding an own vehicle; and
an electronic control unit configured to:
perform a warning to warn a driver of the own vehicle when the electronic control unit determines that the driver performs a mistaken pressing operation of mistakenly pressing an acceleration pedal of the own vehicle with an intention to press a brake pedal of the own vehicle;
execute an autonomous braking control to apply a braking force to the own vehicle to autonomously stop the own vehicle when the electronic control unit determines that a level of potential that the own vehicle collides with the obstacle is larger than a predetermined level; and
execute a stopped state keeping control to apply the braking force to the own vehicle to keep the own vehicle stopped to prevent moving of the own vehicle after the electronic control unit stops the vehicle by the autonomous braking control,
wherein the electronic control unit is configured to change a manner of performing the warning from a first manner to a second manner when the electronic control unit stops the vehicle by the autonomous braking control while the electronic control unit is performing the warning.

2. The driving assist apparatus as set forth in claim 1, wherein:
the electronic control unit is configured to:
execute the autonomous braking control and perform the warning in the first manner when the electronic control unit determines that (i) the level of the potential that the own vehicle collides with the obstacle is larger than the predetermined level, and (ii) the driver performs the mistaken pressing operation; and
terminate executing the autonomous braking control, execute the stopped state keeping control, and perform the warning in the second manner when the electronic control unit stops the vehicle by the autonomous braking control, and determines that the driver performs the mistaken pressing operation.

3. The driving assist apparatus as set forth in claim 1, wherein:
the at least one sensor includes at least one of a camera sensor and a radar sensor.

4. The driving assist apparatus as set forth in claim 1, wherein:
the electronic control unit is configured to determine that the driver performs the mistaken pressing operation when an amount of pressing the acceleration pedal is larger than or equal to an acceleration pedal pressing amount threshold, and a rate of pressing the acceleration pedal is larger than or equal to an acceleration pedal pressing rate threshold.

5. The driving assist apparatus as set forth in claim 1, wherein:
the warning is a warning of generating voice sound; and at least one of a volume of the voice sound, a rate of generating the voice sound, and a cycle of generating the voice sound of the warning in the second manner is smaller than at least corresponding one of the volume of the voice sound, the rate of generating the voice sound, and the cycle of generating the voice sound of the warning in the first manner.

6. The driving assist apparatus as set forth in claim 1, wherein:
the warning is a warning of generating voice sound;
the warning in the first manner is a warning of generating the voice sound expressing a content to prompt the driver to release the acceleration pedal; and
the warning in the second manner is a warning of generating the voice sound expressing a content to prompt the driver to press the brake pedal.

7. The driving assist apparatus as set forth in claim 1, wherein:
the warning is a warning of generating voice sound;
at least one of a volume of the voice sound, a rate of generating the voice sound, and a cycle of generating the voice sound of the warning in the second manner is smaller than at least corresponding one of the volume of the voice sound, the rate of generating the voice sound, and the cycle of generating the voice sound of the warning in the first manner;
the warning in the first manner is a warning of generating the voice sound expressing a content to prompt the driver to release the acceleration pedal; and
the warning in the second manner is a warning of generating the voice sound expressing a content to prompt the driver to press the brake pedal.

8. The driving assist apparatus as set forth in claim 1, wherein:
the warning is a warning of generating voice sound and displaying character display having the same content as a content expressed by the voice sound.

9. The driving assist apparatus as set forth in claim 1, wherein:
the electronic control unit is configured to terminate performing the warning when the electronic control unit terminates executing the stopped state keeping control.

10. The driving assist apparatus as set forth in claim 1, wherein:
the electronic control unit is configured to terminate performing the warning when the brake pedal is pressed.

* * * * *